US012672086B2

(12) United States Patent
Kuppelur et al.

(10) Patent No.: US 12,672,086 B2
(45) Date of Patent: Jun. 30, 2026

(54) PERIODIC REGISTRATION UPDATE PROCEDURE FOR NON-ALLOWED SERVICE AREAS

(71) Applicant: Apple Inc., Cupertino, CA (US)

(72) Inventors: Nitin Kuppelur, Bangalore (IN); Deepak Dash, Bangalore (IN); Roland Gruber, Sauerlach (DE)

(73) Assignee: Apple Inc., Cupertino, CA (US)

( * ) Notice: Subject to any disclaimer, the term of this patent is extended or adjusted under 35 U.S.C. 154(b) by 384 days.

(21) Appl. No.: 18/251,757

(22) PCT Filed: Nov. 4, 2021

(86) PCT No.: PCT/US2021/072231
§ 371 (c)(1),
(2) Date: May 4, 2023

(87) PCT Pub. No.: WO2022/099282
PCT Pub. Date: May 12, 2022

(65) Prior Publication Data
US 2023/0422198 A1 Dec. 28, 2023

(30) Foreign Application Priority Data
Nov. 4, 2020 (IN) .............................. 202041048156

(51) Int. Cl.
*H04W 60/02* (2009.01)
*H04W 48/20* (2009.01)
(52) U.S. Cl.
CPC ........... *H04W 60/02* (2013.01); *H04W 48/20* (2013.01)
(58) Field of Classification Search
CPC .............................. H04W 60/02; H04W 48/20
See application file for complete search history.

(56) References Cited

U.S. PATENT DOCUMENTS

2019/0373441 A1* 12/2019 Ryu ...................... H04W 48/18
2020/0275513 A1 8/2020 Park et al.
2024/0080790 A1* 3/2024 Totadamane Ramappa ................ H04W 60/00

FOREIGN PATENT DOCUMENTS

CN 110636604 12/2019
CN 112449417 A * 3/2021 ............ H04W 48/16
(Continued)

OTHER PUBLICATIONS

MediaTek Inc., "Periodic update is allowed also in non-allowed area", 3GPP TSG-CT WG1 Meeting #119, C1-195206, Sep. 9, 2019, 3 sheets.

(Continued)

*Primary Examiner* — Charles T Shedrick
(74) *Attorney, Agent, or Firm* — Fay Kaplun & Marcin, LLP

(57) ABSTRACT

A user equipment (UE) that initiates a periodic update timer, wherein the UE is configured to perform a periodic registration update procedure in response to a periodic update timer expiry event, identifies that the periodic update timer has expired, wherein the periodic update timer expiry event occurs when the UE is out of coverage, selects a cell to camp on, wherein the cell is known to be in a non-allowed area and initiates the periodic registration update procedure in response to the periodic update timer expiry event, wherein the UE delays the periodic registration update procedure until the UE enters a fifth generation mobility management (5GMM) operating substate associated with camping on the cell that is known to be in the non-allowed area.

19 Claims, 3 Drawing Sheets

Network Arrangement 100

(56)                    References Cited

FOREIGN PATENT DOCUMENTS

| JP | 2025515410 A | * | 5/2025 | ............ H04W 76/19 |
| TW | 201742419 | | 12/2017 | |
| WO | 2020091684 | | 5/2020 | |
| WO | WO-2022099231 A1 | * | 5/2022 | ............ H04W 60/00 |

OTHER PUBLICATIONS

Apple, "Buffered T3512 handling in non allowed service area", 3GPP TSG-CT WG1 Meeting #127-e, C1-207208, Nov. 6, 2020, 3 sheets.

Huawei et al., "Strictly periodic registration timer indication for MICO mode", 3GPP TSG-CT WG1 Meeting #116, C1-192275, Apr. 8-12, 2019, 38 sheets.

Zhang, "Discussion on IU Release Resulted from Cell Update in TD-SCDMA System", Communications Technology, No. 228, Totally, vol. 43, No. 12, 2010, Network Optimization Center, Dec. 12, 2010, 3 sheets.

* cited by examiner

UE 110

PERIODIC REGISTRATION UPDATE PROCEDURE FOR NON-ALLOWED SERVICE AREAS

BACKGROUND

A user equipment (UE) may establish a registration context with a 5G network. When registered, the UE may perform operations related to mobility management. For example, in some scenarios, the UE may be configured to periodically transmit a signal to keep the network updated with regard to the current UE location. This may enable the network to page the UE for mobile terminating (MT) services even when the UE is in a restricted area. To ensure that the registration context is not maintained indefinitely with the network, the network may be configured to implicitly release the UE registration context, if a periodic update is not received from the UE within a particular time window.

SUMMARY

Some exemplary embodiments are related to a processor configured to perform operations. The operations include initiating a periodic update timer, wherein the UE is configured to perform a periodic registration update procedure in response to a periodic update timer expiry event, identifying that the periodic update timer has expired, wherein the periodic update timer expiry event occurs when the UE is out of coverage, selecting a cell to camp on, wherein the cell is known to be in a non-allowed area and initiating the periodic registration update procedure in response to the periodic update timer expiry event, wherein the UE delays the periodic registration update procedure until the UE enters a fifth generation mobility management (5GMM) operating substate associated with camping on the cell that is known to be in the non-allowed area.

Other exemplary embodiments are related to user equipment (UE) including a transceiver configured to communicate with a fifth generation (5G) network and a processor communicatively coupled to the transceiver and configured to perform operations. The operations include initiating a periodic update timer, wherein the UE is configured to perform a periodic registration update procedure in response to a periodic update timer expiry event, identifying that the periodic update timer has expired, wherein the periodic update timer expiry event occurs when the UE is out of coverage, selecting a cell to camp on, wherein the cell is known to be in a non-allowed area and initiating the periodic registration update procedure in response to the periodic update timer expiry event, wherein the UE delays the periodic registration update procedure until the UE enters a 5G mobility management (5GMM) operating substate associated with camping on the cell that is known to be in the non-allowed area.

Still further exemplary embodiments are related to a method performed by a user equipment (UE). The method includes initiating a periodic update timer, wherein the UE is configured to perform a periodic registration update procedure in response to a periodic update timer expiry event, identifying that the periodic update timer has expired, wherein the periodic update timer expiry event occurs when the UE is out of coverage, selecting a cell to camp on, wherein the cell is known to be in a non-allowed area and initiating the periodic registration update procedure in response to the periodic update timer expiry event, wherein the UE delays the periodic registration update procedure until the UE enters a fifth generation mobility management (5GMM) operating substate associated with camping on the cell that has the TAI that is known to be in the non-allowed area.

DETAILED DESCRIPTION

Figure 1:
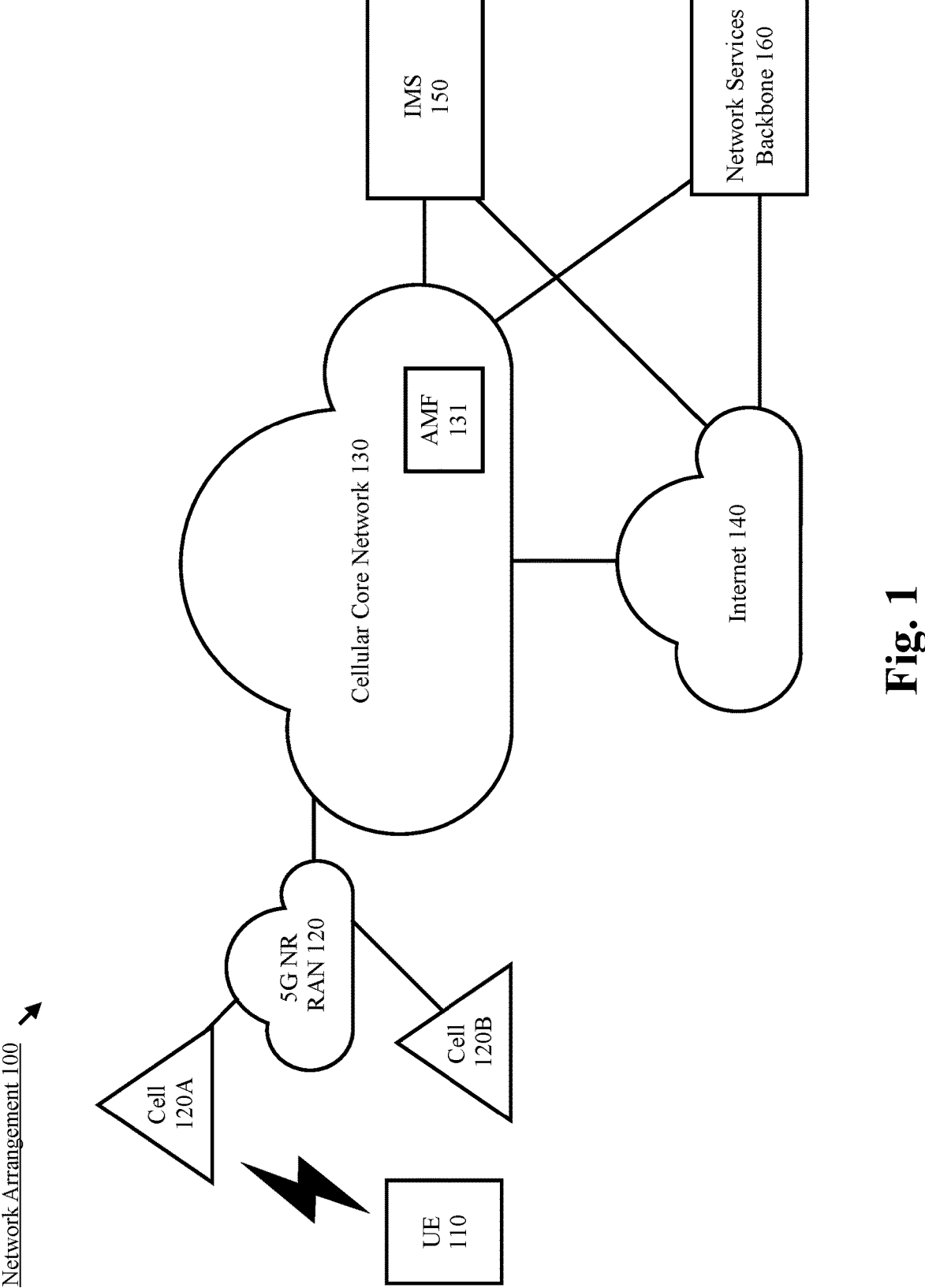
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to a user equipment (UE) performing a periodic registration update for 5G mobility management.

The exemplary embodiments are described with regard to a UE. However, reference to a UE is merely provided for illustrative purposes. The exemplary embodiments may be utilized with any electronic component equipped with hardware, software, and/or firmware configured to exchange information and data with the network. Therefore, the UE as described herein is used to represent any electronic component.

The exemplary embodiments are also described with regard to a periodic registration update procedure for 5G systems. The periodic registration update procedure may be performed to provide the network with an indication of the current UE location. The network may use this location information to perform paging for mobile terminating (MT) services (e.g., voice calls, etc.). As will be described in more detail below, certain conditions have been identified as creating a scenario in which the UE assumes MT services are available but the UE is actually unreachable because the network has implicitly detached the UE connection. The exemplary embodiments relate to performing the periodic registration update procedure under unconventional circumstances to prevent a loss of synchronization between the UE and the network.

During operation, the UE may transition between various 5G mobility management (5GMM) operating states. Those skilled in the art will understand that the active 5GMM operating state may control UE behavior with regard to 5G mobility management operations. For instance, the UE may enter the state 5GMM-REGISTERED when the initial registration procedure is performed. The 5GMM-REGISTERED state may be further characterized based on one or more conditions associated with the UE's network connection. To provide an example, when the UE camps on a cell that has a tracking area identity (TAI) that is an allowed tracking area, the UE enters the 5GMM-REGISTERED substate "5GMM-REGISTERED.NORMAL-SERVICE." In this state, the UE may be configured with the full scope of functionalities normally available to the UE via the network connection. Thus, the UE may perform mobility management operations under the assumption that the normally available functionalities are configured.

In another example, when the UE camps on a cell that has a TAI that is a non-allowed tracking area, the UE enters the 5GMM-REGISTERED substate "5GMM-REGISTERED.NON-ALLOWED-SERVICE." In this state, the UE may be configured with limited functionality via the network connection. For instance, the UE may be restricted to only select types of mobile originating (MO) traffic (e.g., emergency services, response to paging, etc.). Thus, the UE may perform mobility management under the assumption that only select types of MO signaling is permitted.

Throughout this description, the following 5GMM operating states may be referenced, "5GMM-REGISTERED. NORMAL-SERVICE," "5GMM-REGISTERED.NON-ALLOWED-SERVICE," "5GMM-REGISTERED.NO-CELL-AVAILABLE," and "5GMM-REGISTERED.PLMN-SEARCH." Those skilled in the art will understand the type of behavior that may be exhibited by the UE for each of these operating states. Specific examples of how each of these 5GMM operating states relate to the UE performing a periodic registration update for 5G mobility management will be described in more detail below.

From the perspective of the UE, the 5G periodic registration update procedure is controlled by a periodic update timer. The Third Generation Partnership Project (3GPP) may refer to this timer as "T3512" in Technical Specification (TS) 24.501. Those skilled in the art will understand that the expiration of T3512 may be used to trigger the UE to initiate the registration procedure for mobility and periodic registration area updating. Throughout this description, this timer may be referred to as "T3512" or a periodic update timer.

When the network does not receive a periodic registration update message (e.g., a registration request) within a particular time window, the network may implicitly detach the UE. For example, the network may operate a mobile reachable timer. If a signal is not received from the UE prior to the expiration of the mobile reachable timer, the network may implicitly detach or de-register the UE connection. However, under conventional circumstances, there may be scenarios in which the UE may assume it is still attached but the network has actually implicitly detached the UE. This has a negative impact on the user experience because the UE may display an indication to the user that the UE is in full service, but the UE is actually unreachable for MT services. The exemplary embodiments relate to performing the periodic registration update procedure under unconventional circumstances to prevent a loss of synchronization between the UE and the network.

FIG. 1 shows an exemplary network arrangement 100 according to various exemplary embodiments. The exemplary network arrangement 100 includes a UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the network with which the UE 110 may wirelessly communicate is a 5G NR radio access network (RAN) 120. However, the UE 110 may also communicate with other types of networks (e.g. 5G cloud RAN, a next generation RAN (NG-RAN), a long term evolution RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the NR RAN 120.

The 5G NR RAN 120 may be a portion of a cellular network that may be deployed by a network carrier (e.g., Verizon, AT&T, T-Mobile, etc.). The RAN 120 may include, cells that are configured to send and receive traffic from UEs that are equipped with the appropriate cellular chip set. In this example, the 5G NR RAN 120 includes a cell 120A and a cell 120B. However, reference to a cell is merely provided for illustrative purposes, any appropriate cell or base station may be deployed (e.g., Node Bs, eNodeBs, HeNBs, eNBs, gNBs, gNodeBs, macrocells, microcells, small cells, femtocells, etc.).

The cells 120A, 120B may include one or more communication interfaces to exchange data and/or information with camped UEs, the RAN 120, the cellular core network 130, the internet 140, etc. Further, the cells 120A, 120B may include a processor configured to perform various operations. For example, the processor of the cell may be configured to perform operations related to providing the UE 110 with dedicated priority information. However, reference to a processor is merely for illustrative purposes. The operations of the cells 120A, 120B may also be represented as a separate incorporated component of the cell or may be a modular component coupled to the cell, e.g., an integrated circuit with or without firmware. For example, the integrated circuit may include input circuitry to receive signals and processing circuitry to process the signals and other information. In addition, in some cells, the functionality of the processor is split among two or more processors such as a baseband processor and an applications processor. The exemplary embodiments may be implemented in any of these or other configurations of a cell.

Those skilled in the art will understand that any association procedure may be performed for the UE 110 to connect to the 5G NR PAN 120. For example, as discussed above, the 5G NR PAN 120 may be associated with a particular network carrier where the UE 110 and/or the user thereof has a contract and credential information (e.g., stored on a SIM card). Upon detecting the presence of the 5G NR PAN 120, the UE 110 may transmit the corresponding credential information to associate with the 5G NR PAN 120. More specifically, the UE 110 may associate with a specific cell (e.g., cell 120A, cell 120B).

In addition to the RAN 120, the network arrangement 100 also includes a cellular core network 130, the Internet 140, an IP Multimedia Subsystem (IMS) 150, and a network services backbone 160. The cellular core network 130 may be considered to be an interconnected set of components that manages the operation and traffic of the cellular network. In this example, an access and mobility management function (AMF) 131 is deployed within the core network 130. Those skilled in the art will understand that the AMF 131 is a network function that is configured to perform operations related to mobility management such as, but not limited to, paging, non-access stratum (NAS) management and registration procedure management between the UE 110 and the core network 130. In addition, the AMF 131 may be equipped with one or more communication interfaces (e.g., N1, N2, etc.) to communicate directly or indirectly with other network components (e.g., network functions, PANs, UEs, etc.).

The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
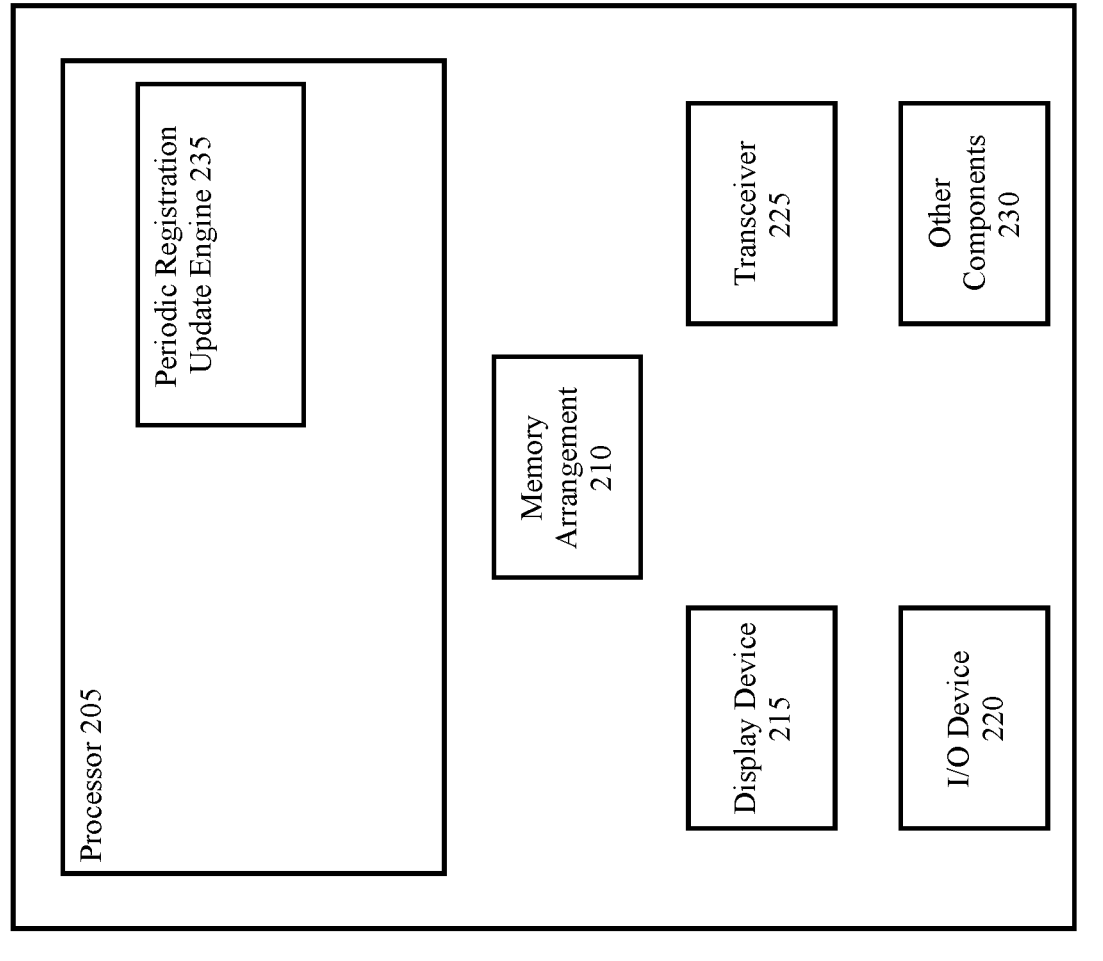
FIG. 2 shows an exemplary user equipment (UE) according to various exemplary embodiments.
Figure 2:

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include a periodic registration update engine 235. The periodic registration update engine 235 may manage the operation of the periodic update timer (e.g., T3512) and other aspects of the periodic registration update procedure.

The above referenced engine 235 being an application (e.g., a program) executed by the processor 205 is only exemplary. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

As mentioned above, the exemplary embodiments relate to performing the periodic registration update procedure under unconventional circumstances to prevent a loss of synchronization between the UE and the network. The periodic registration update procedure may include a signaling exchange between the UE 110 and the AMF 131.

Under conventional circumstances, if the periodic update timer (e.g., T3512) expires when the UE 110 is in the 5GMM-REGISTERED.NON-ALLOWED-SERVICE state, the UE 110 is configured to initiate a periodic registration update procedure. However, if the periodic update timer expires while the UE 110 is in a state other than 5GMM- REGISTERED.NORMAL SERVICE or 5GMM-REGISTERED.NON-ALLOWED-SERVICE and then the UE 110 returns back to the 5GMM-REGISTERED.NON-ALLOWED-SERVICE state, the UE 110 is not configured to initiate the periodic registration update procedure. These types of conditions may create a scenario in which the UE 110 may assume that service is available, but the UE 110 is actually unreachable for MT services because the AMF 131 has implicitly detached the UE 110.

The exemplary embodiments relate to a scenario in which the periodic update timer expires while the UE 110 is in a state other than 5GMM-REGISTERED.NORMAL SERVICE or 5GMM-REGISTERED.NON-ALLOWED-SERVICE and then the UE 110 returns back to the 5GMM-REGISTERED.NON-ALLOWED-SERVICE state due to camping on a cell that has a TAI that is not on the list of allowed tracking areas. A specific example of performing the periodic registration update procedure under these unconventional circumstances will be described in more detail below.

As mentioned above, when the UE 110 enters the state 5GMM-REGISTERED.NON-ALLOWED-SERVICE, the UE 110 is restricted to only select types of MO signaling. For example, the UE 110 may be configured to transmit signals for emergency services, high priority access, in response to paging, in response to a notification or for indicating a change of 3GPP packet switch (PS) data off UE status. In addition, the UE 110 may be configured to perform the periodic registration update procedure, whenever triggered, to keep the network updated with regard to the current UE 110 location. However, other types of MO traffic may not be performed when the UE 110 is in the 5GMM-REGISTERED.NON-ALLOWED-SERVICE state. The UE 110 may be considered to be in a restricted area when the UE 110 is camped on a cell that has a TAI that is not on the list of allowed tracking areas.

Figure 3:
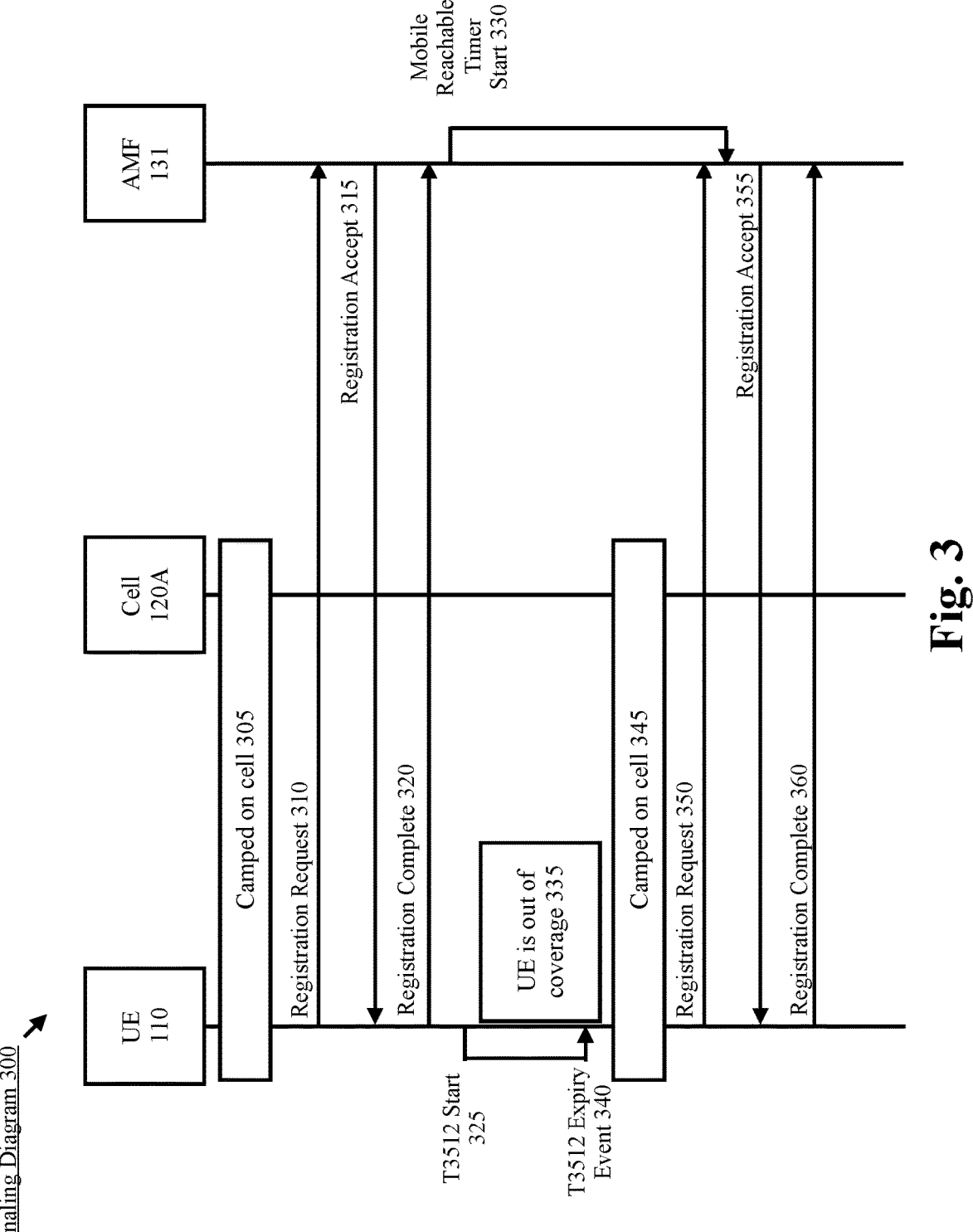
FIG. 3 shows a signaling diagram for a periodic registration update procedure according to various exemplary embodiments.

FIG. 3 shows a signaling diagram 300 for a periodic registration update procedure according to various exemplary embodiments. The signaling diagram 300 will be described with regard to the network arrangement of FIG. 1 and the UE 110 of FIG. 2. The signaling diagram 300 includes the UE 110, the cell 120A and an AMF 131.

In 305, the UE 110 is camped on the cell 120A. For example, the UE 110 may establish a radio resource control (RRC) connection with the currently camped cell 120A.

In 310, the UE 110 may transmit a registration request to the AMF 131. Those skilled in the art will understand that the registration request may include various types of information such as, but not limited to, a last TAI, a requested network slice, UE capability information, packet data unit (PDU) session related information and/or a registration type (e.g., initial registration, periodic registration update, etc.).

In 315, the AMF 131 may transmit a registration accept message to the UE 110. The registration accept message may include, but is not limited to, a list of allowed tracking areas for the UE 110 and/or a list of non-allowed tracking areas for the UE 110. When the UE 110 camps on a cell that has a TAI that is included in the list of allowed tracking areas and/or is not included in the list of non-allowed tracking areas, the UE 110 may enter the 5GMM-REGISTERED.NORMAL-SERVICE state. Alternatively, when the UE 110 camps on a cell that has a TAI that is not included in the list of allowed tracking areas and/or is included in the list of non-allowed tracking areas, the UE 110 may enter the 5GMM-REGISTERED.NON-ALLOWED-SERVICE state. Throughout this description, a cell may be characterized as being "known to be in a non-allowed area" when the cell has a TAI that is not included in the list of allowed tracking areas and/or a TAI that is included in the list of non-allowed tracking areas In one example, the cell 120A may have a TAI that is not included in the list of allowed tracking areas. For instance, the cell 120A may have a tracking area code (TAC), TAC1. However, the list of allowed tracking areas provided in the registration accept message only identifies TAC2. Thus, the cell may be known to be in a non-allowed area because the UE 110 identified that the cell has a TAI that is not included in the list of allowed tracking areas. In another example, the cell 120A may have a TAI that is included in the list of non-allowed tracking areas. For instance, the cell 120A may be identified by TAC1. The list of non-allowed tracking areas provided in the registration accept message may include TAC1. Thus, the cell may be known to be in a non-allowed area because the UE 110 identified that the cell has a TAI that is included in the list of non-allowed tracking areas. The above examples are merely provided for illustrative purposes, in an actual deployment scenario, the lists may identify any appropriate number of tracking areas.

The signaling diagram 300 will be described with regard to the cell 120A having a TAI that is not included in the list of allowed tracking areas. Those skilled in the art will understand that the exemplary concepts described herein are also applicable to a scenario in which the cell 120A has a TAI that is included in the list of non-allowed tracking areas.

In 320, the UE 110 transmits a registration complete message to the AMF 131. At this time, the UE 110 is in the 5GMM-REGISTERED.NON-ALLOWED-SERVICE state. As indicated above, when in a restricted area, the UE 110 only performs select types of MO signaling.

In 325, the UE 110 initiates the periodic update timer (e.g. T3512). The periodic update timer may be reset based on certain predetermined conditions. However, as indicated above, a periodic update timer expiry event may trigger the UE 110 to initiate the periodic registration update procedure.

In 330, the AMF 131 initiates the mobile reachable timer. The mobile reachable timer may be reset or stopped based on a signal received from the UE 110. However, if the mobile reachable timer expires, the AMF 131 may implicitly detach or de-register the UE 110. Although not shown in the signaling diagram 300, in addition to or instead of the mobile reachable timer, an implicit de-register timer may also be used by the AMF 131.

In 335, the UE 110 is out of coverage. Those skilled in the art will understand that the UE 110 may lose coverage for any of a variety of different reasons. The exemplary embodiments are not limited to UE 110 losing coverage or service for any particular reason.

When the UE 110 is out of coverage, the UE 110 may transition from the 5GMM-REGISTERED.NON-AL-LOWED-SERVICE state to a different 5GMM-REGIS-TERED substate. For example, the UE 110 may transition from the 5GMM-REGISTERED.NON-ALLOWED-SER-VICE state to the 5GMM-REGISTERED.PLMN-SEARCH state. In this state, the UE 110 may search for public land mobile networks (PLMNs) to camp on. In another example, the UE 110 may enter the 5GMM-REGISTERED.NO-CELL-AVAILABLE state. In this state, no 5G services are available to the UE 110.

In 340, a periodic timer expiry event occurs. In this example, the UE 110 is in a 5GMM operating state that is not 5GMM-REGISTERED.NORMAL-SERVICE or 5GMM-REGISTERED.NON-ALLOWED-SERVICE when the periodic timer expires. For example, the UE 110 may be in the 5GMM-REGISTERED.NO-CELL-AVAILABLE state or the 5GMM-REGISTERED.PLMN-SEARCH state. When the periodic update timer expires and the UE 110 is not in the 5GMM-REGISTERED.NORMAL-SERVICE state or the 5GMM-REGISTERED.NON-ALLOWED-SERVICE state (e.g., 5GMM-REGISTERED.NO-CELL-AVAILABLE, 5GMM-REGISTERED.PLMN-SEARCH, etc.), the UE 110 may buffer the periodic timer expiry event for subsequent processing. Under conventional circumstances, the UE 110 is only configured to handle the buffered timer expiry event when the UE 110 returns to the 5GMM-REGISTERED.NORMAL-SERVICE state. However, if the UE 110 selects a cell that has a TAI that is not in the list of allowed tracking areas, the UE 110 will enter the 5GMM-REGISTERED.NON-ALLOWED-SERVICE state. In this type of scenario, under conventional circumstances, the buffered periodic update timer expiry event may not be handled for a significant amount of time, if ever. Consequently, the AMF 131 mobile reachable timer may expire which may cause the AMF 131 to implicitly detach or de-register the UE 110. Here, the UE 110 may assume that it is still in service but the AMF 131 may assume that the UE 110 is not reachable and thus, the AMF 131 does not attempt to page the UE 110 for MT services. The exemplary embodiments are configured to prevent a loss of synchronization between the UE 110 and the AMF 131 and prevent this type of scenario from occurring.

In 345, the UE 110 camps on the cell 120A. Thus, the UE 110 recovers service on a cell that has a TAI that is not included in the list of allowed tracking areas and enters the 5GMM-REGISTERED.NON-ALLOWED-SERVICE state. In this example, the UE 110 reselects the cell 120A. However, the exemplary embodiments are not limited to this type of scenario and may apply to any scenario in which the UE 110 selects a cell to camp on that is not included in the allowed tracking area list while a periodic timer expiry event is pending. For example, the UE 110 may select the cell 120B but the cell 120B may also have a TAI that is not included in the list of allowed tracking areas.

In 350, the UE 110 triggers the periodic registration update procedure due to the pending periodic update timer expiry event. For example, the UE 110 may transmit a registration request to the AMF 131. The registration request may be received prior to the expiration of the mobile reachable timer and thus, the AMF 131 may maintain the UE 110 connection. In other words, if the UE 110 is in a state other than 5GMM-REGISTERED.NORMAL-SERVICE or 5GMM-REGISTERED.NON-ALLOWED-SERVICE over 3GPP access when timer T3512 expires, the periodic registration procedure is delayed until the UE 110 returns to 5GMM-REGISTERED.NON-ALLOWED-SERVICE over 3GPP access. As indicated above, under conventional circumstances, the UE 110 is not configured to trigger the periodic registration update procedure under these conditions. Thus, in this example, the UE 110 initiates the periodic registration update procedure under unconventional circumstances.

In 355, the AMF 131 transmits the registration accept message to the UE 110. In 360, the UE 110 transmits the registration complete message to the AMF 131. After this periodic registration update procedure is complete, the UE 110 and the AMF 131 are synchronized. Thus, the UE 110 will be able to receive a page for MT services from the network.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   initiating a periodic update timer, wherein the UE is configured to perform a periodic registration update procedure in response to a periodic update timer expiry event;
   identifying that the periodic update timer has expired, wherein the periodic update timer expiry event occurs when the UE is out of coverage;
   selecting a cell to camp on, wherein the cell is known to be in a non-allowed area; and
   initiating the periodic registration update procedure in response to the periodic update timer expiry event, wherein the UE delays the periodic registration update procedure until the UE enters a fifth generation mobility management (5GMM) operating substate associated with camping on the cell that is known to be in the non-allowed area, wherein the 5GMM operating substate is 5GMM-REGISTERED.NON-ALLOWED-SERVICE.

2. The processor of claim 1, wherein the periodic update timer is timer T3512.

3. The processor of claim 1, wherein initiating the periodic registration update procedure includes transmitting a registration request to an access and mobility management function (AMF).

4. The processor of claim 1, wherein the UE transitions from a first 5GMM operating substate to a second different 5GMM operating substate when the UE is out of coverage.

5. The processor of claim 4, wherein the second different 5GMM operating substate is a 5GMM-REGISTERED.NO-CELL-AVAILABLE or 5GMM-REGISTERED.PLMN-SEARCH.

6. The processor of claim 5, wherein the UE transitions from the second 5GMM operating substate to a third 5GMM operating substate when the UE camps on the cell that is known to be in a non-allowed area, wherein the third 5GMM operating substate is one of the same as the first 5GMM operating substate or different from the first 5GMM operating substate.

7. The processor of claim 1, the operations further comprising:
   identifying that the cell has a tracking area identity (TAI) that is not included in an allowed tracking area list for the UE, wherein the cell is known to be in the non-allowed area based on the identifying.

8. The processor of claim 1, the operations further comprising:
   identifying that the cell has a tracking area identity (TAI) that is included in a non-allowed tracking area list for the UE, wherein the cell is known to be in the non-allowed area based on the identifying.

9. A user equipment (UE), comprising:
   a transceiver configured to communicate with a fifth generation (5G) network; and
   a processor communicatively coupled to the transceiver and configured to perform operations comprising:
      initiating the periodic registration update timer, wherein the UE is configured to perform a periodic registration update procedure in response to a periodic update timer expiry event;
      identifying that the periodic update timer has expired, wherein the periodic update timer expiry event occurs when the UE is out of coverage;
      selecting a cell to camp on, wherein the cell is known to be in a non-allowed area; and
      initiating the periodic registration update procedure in response to the periodic update timer expiry event, wherein the UE delays the periodic registration update procedure until the UE enters a 5G mobility management (5GMM) operating substate associated with camping on the cell that is known to be in the non-allowed area, wherein the 5GMM operating substate is 5GMM-REGISTERED.NON-AL-LOWED-SERVICE.

10. The UE of claim 9, wherein the periodic update timer is timer T3512.

11. The UE of claim 9, wherein initiating the periodic registration update procedure includes transmitting a registration request to an access and mobility management function (AMF).

12. The UE of claim 9, wherein the UE transitions from a first 5GMM operating substate to a second different 5GMM operating substate when the UE is out of coverage.

13. The UE of claim 12, wherein the second different 5GMM operating substate is a 5GMM-REGISTERD.NO-CELL-AVAILABLE or 5GMM-REGISTERED. PLMN-SEARCH.

14. The UE of claim 13, wherein the UE transitions from the second 5GMM operating substate to a third 5GMM operating substate when the UE camps on the cell that has the TAI that is not included in the allowed tracking area list for the UE, wherein the third 5GMM operating substate is one of the same as the first 5GMM operating substate or different from the first 5GMM operating substate.

15. A method, comprising:
   at a user equipment (UE):
      initiating a periodic timer, wherein the UE is configured to perform a periodic registration update procedure in response to a periodic update timer expiry event;

identifying that the periodic update timer has expired, wherein the periodic update timer expiry event occurs when the UE is out of coverage;

selecting a cell to camp on, wherein the cell is known to be in a non-allowed area; and initiating the periodic registration update procedure in response to the periodic update timer expiry event, wherein the UE delays the periodic registration update procedure until the UE enters a fifth generation mobility management (5GMM) operating substate associated with camping on the cell that has the TAI that is known to be in the non-allowed area, wherein the 5GMM operating substate is 5GMM-REGISTERED.NON-ALLOWED-SERVICE.

16. The method of claim 15, wherein the periodic update timer is T3512.

17. The method of claim 15, wherein initiating the periodic registration update procedure includes transmitting a registration request to an access and mobility management function (AMF).

18. The method of claim 15, wherein the UE transitions from a first 5GMM operating substate to a second different 5GMM operating substate when the UE is out of coverage.

19. The method of claim 18, wherein the second 5GMM operating substate is 5GMM-REGISTERD.NO-CELL-Available or 5GMM-REGISTERED.PLMN-SEARCH, and wherein the UE transitions form the second 5GMM operating substate to a third 5GMM operating substate when the UE camps on the cell that has the TAI that is not included int eh allowed tracking area list for the UE, wherein the third 5GMM operating substate is one of the same as the first 5GMM operating substate or different from the first 5GMM operating substate.

* * * * *